United States Patent [19]

Sakai et al.

[11] Patent Number: 5,078,531
[45] Date of Patent: Jan. 7, 1992

[54] BALL JOINT

[75] Inventors: Motohiro Sakai; Tsuneharu Wasada, both of Aichi, Japan

[73] Assignee: TRW Steering & Industrial Products (JAPAN) Co., Ltd., Tokyo, Japan

[21] Appl. No.: 615,350

[22] Filed: Nov. 19, 1990

[30] Foreign Application Priority Data

Dec. 27, 1989 [JP] Japan ............................ 1-339493

[51] Int. Cl.⁵ .................................................. F16C 11/00
[52] U.S. Cl. .................................... 403/140; 403/135; 403/133
[58] Field of Search ............... 403/135, 140, 132, 138, 403/133, 139, 122; 29/898.044, 898.047, 898.046, 898.043; 384/208, 206, 211

[56] References Cited

U.S. PATENT DOCUMENTS 3,197,842 8/1965 Parker ........................... 384/206 X
3,560,035 2/1971 Kindel ............................. 403/140
3,677,585 7/1972 Scheerer ......................... 403/140

Primary Examiner—Andrew V. Kundrat
Attorney, Agent, or Firm—Tarolli, Sundheim & Covell

[57] ABSTRACT

Disclosed is a ball joint. The ball joint comprises a socket; a bearing provided along an inner face of said socket; and a ball stud embraced by said bearing; said socket including a stepped portion at an upper part and a rising portion rising integrally from an outer periphery of said stepped portion; said bearing including a flange portion at an upper part; said flange portion forcibly holding said ball stud to prevent a removal of said ball stud by caulking said stepped portion of said socket from upper and outer crosswise directions with said rising portion of said socket.

4 Claims, 3 Drawing Sheets

BALL JOINT

BACKGROUND OF THE INVENTION

The present invention relates to a ball joint.

Ball joints have hitherto been utilized for various machines. One known ball joint is shown in FIG. 6. The ball joint consists of, e.g., a socket a, a bearing b provided therein, a ball stud c accommodated in the bearing b and a metal plug d for preventing removal of the ball stud c. The plug d is placed on a stepped portion c shaped upwardly and inwardly of the socket a. An upper end of the socket a is thereafter caulked inwardly by means of a spinning roller or the like, thereby forming a caulked portion f. The plug d is thus enclosed between the caulked portion f and the bearing b.

FIG. 7 shows an arrangement in which the plug d is not provided. For example, the bearing b is incorporated into the socket a. The ball stud c is set in the bearing b. subsequent to this step, an upper part of the socket a is press-caulked spherically inwards, thus enclosing the bearing (Japanese Patent Laid-Open No. 25657/1976).

The known structure described above, however presents many defects as follows. To be specific, the plug d is indispensable for the ball joint shown in FIG. 6, as a result of which the number of parts increases and the number of assembling steps correspondingly increases. A step of machining the plug d with a given accuracy. It is also therefore required. As a result, manfacturing costs thereof are high. In relation to the ball joint of FIG. 7, there is a problem such that a scatter effect is caused between the socket and the bearing. This means the bearing presses against the spherical surface of the ball stud with excessive intensity, or the caulking strength is insufficient. In a great majority of cases, a press-contact state between the ball stud spherical surface and the bearing is unstable. In consequence, uniform performance of the ball joint cannot be obtained. When caulking the socket, the amount of a caulked portion of the socket is variable. This makes an unstable deformation of the bearing. Consequently, the ability of bearing to hold a ball stud is not constant, with the result that a large number of ball joints will be subject to deterioration.

SUMMARY OF THE INVENTION

It is a primary object of the present invention to obviate the problems inherent in the prior art ball joint shown in FIG. 6.

To this end, according to one aspect of the invention, there is provided a ball joint comprising: a socket; a bearing provided along an inner face of the socket; and a ball stud embraced by the bearing, characterized in that: the socket includes a stepped portion at an upper part and a rising portion rising integrally from an outer periphery of the stepped portion; and the bearing includes a flange portion at an upper part, the flange portion holding the ball stud and removal of the ball stud being prevented by caulking the stepped portion of the socket from upper and outer crosswise directions from the rising portion of the socket.

In accordance with the present invention, to eliminate especially the problems with relation to the ball joint of FIG. 6, as in the case of the ball joint shown in FIG. 7, a plug is not needed, and the bearing is retained by being caulked in the socket. This arrangement decreases the necessary nummber of components and enables manufacturing at low cost. Besides, according to the present invention, to obviate the problems of the ball joint shown in FIG. 7, the flange portion is formed on an outer face of the bearing on the caulking side. The socket is provided with the stepped portion for accommodating the flange portion, whereby only the flange portion of the bearing can be held by caulking the socket. No deformation is caused in the ball stud retaining face of the bearing. The spherical face of the ball stud can be held surely and stably by the predetermined preloads applied to the bearing.

According to the present invention, the socket includes the stepped portion and the rising portion rising integrally from the outer periphery of the stepped portion at its upper part. The bearing is provided at its upper part with a flange portion a diameter of which is expanded. The flange portion retains the ball stud by being incorporated so as to caulk the stepped portion of the socket from the upper and outer crosswise directions with the rising portion of the socket. This caulking process makes it impossible to remove the ball stud from the bearing. The gaps of absorbing vertical and crosswise deformations are formed between the bearing providing the preloads acting towards the center of the ball stud and the socket holding the outer periphery of the bearing.

Other objects and advantages of the present invention will become apparent during the following discussion taken in conjunction with the accompanying drawings in which:

FIG. 1 is a view depicting a whole ball joint of this invention;

FIG. 2 is a partially enlarged view showing the ball joint of the invention;

FIG. 3 is a partially sectional view illustrating a bearing according to the present invention;

FIG. 4 is a view showing a relationship between the bearing and a socket according to the present invention;

FIG. 5 is a view showing another embodiment of the bearing; and

FIGS. 6 and 7 are views each showing an example of a known ball joint.

Figure 1:
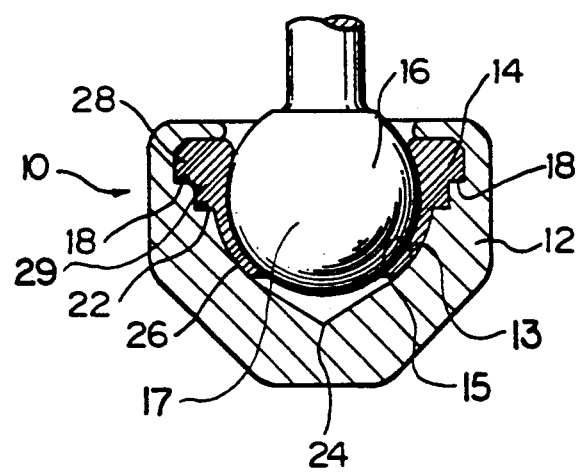
FIG. 1 illustrates a ball joint 10. The ball joint 10 includes a socket 12. A recess 13 is defined within the socket 12. The ball joint 10 includes a bearing 14 disposed within the recess 13 of the socket 12. The bearing 14 defines a spherical cavity 15. The ball joint 10 includes a ball stud 16. The ball stud 16 includes a ball portion 17. The ball portion 17 is disposed within the spherical cavity 15 in the bearing 14.

The socket 12 is typically made of a metal. Formed on an upper inner wall face of the socket 12 is a first annular cavity 19 which is partially defined by a stepped portion 18 a diameter of which is expanded outwards in the radial direction. A thin rising portion 20, as indicated by a broken line of FIG. 2, extends integrally from an outer part of the stepped portion 18. A second annular cavity 21 is formed on the inner wall of the recess and is partially defined by a second stepped portion 22 is shaped downwardly of the stepped portion 18 on the inner wall face of the socket 12. A middle member 26 extending from the second stepped portion 22 to a bottom 24 assumes a curved surface having a substantially constant radius.

Figure 3:
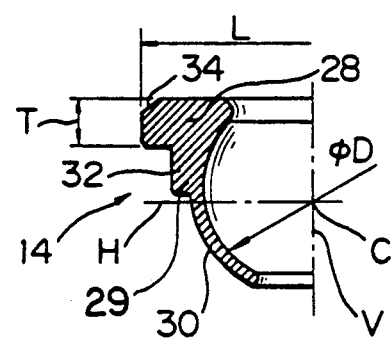

The bearing 14 is, as illustrated in, e.g., FIG. 3, composed of an upper flange portion 28 having an expanded diameter, a lower thin member 30 and a middle connecting member 32 which defines a middle or second flange 29. The lower thin member 30 is adapted to the middle member 26 of the socket 12. The inside of the middle member 26 assumes a curved surface having, e.g., a diameter D passing through a center C of the ball stud accommodated in the socket 12. An outside diameter L of the upper flange portion 28 is larger than a value given by (1.15×D). A thickness T of the flange portion 28 is approximately (0.10–0.15)×D. An upper external end 34 of the flange portion 30 is chamfered.

The bearing 14 serving as a spherical face retaining member of this invention is generally made of a synthetic resin. The bearing 14 is desirably formed to generate preloads p, as depicted in FIG. 4, acting in the direction toward the center of the bearing.

Figure 4:
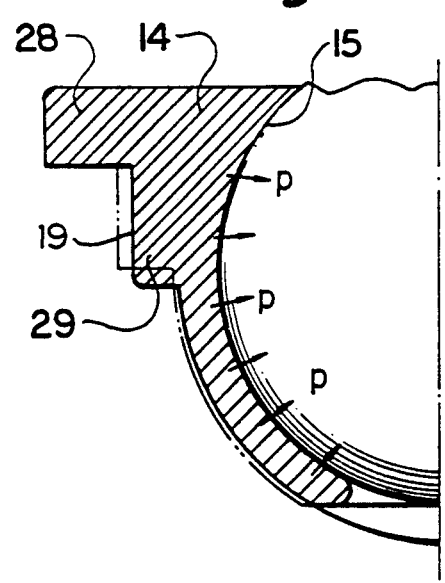
Figure 5:
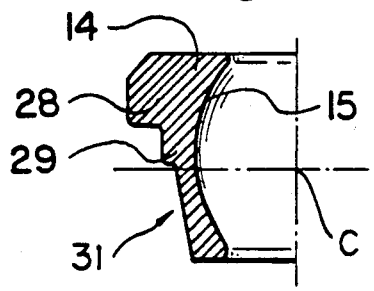
Figure 6:
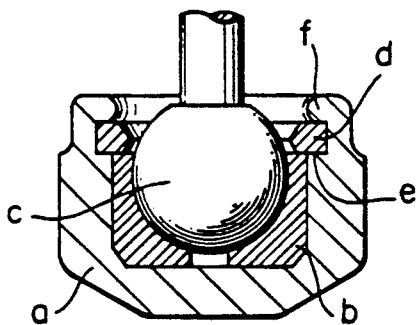
Figure 7:
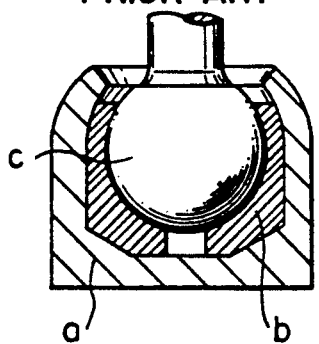

Turning to FIG. 4 there is shown another embodiment of the bearing 14. In this embodiment, an outer surface of the thin member 30 assumes a spherical configuration, the thin member 30 originating from an upper part of a line H passing through the center C and orthogonal to a line V vertical to the center C of the ball stud 16 of the bearing 14 shown in FIG. 3. In contrast with this, an outer surface of a thin member 31 of FIG. 5 assume a conical configuration. This embodiment is suited to a case where the middle member 26 of the socket 12 is machined in the conical shape. The configuration of the outer surface of the thin bearing member 30 adequately corresponds to a configuration of the middle socket member, thereby generating uniform preloads p (FIG. 4).

The spherical face of the ball stud 16 is retained by the bearing 14. The configuration and other elements of the ball stud 16 are the same as those known.

When forming the ball joint 10 of the invention, the ball stud 16 is at first fitted into the bearing 14 to provide a subassembly. Next, the subassembly is set in the socket 12. At this time, an outer peripheral face of the connecting member of the bearing is fitted to a middle face 19 for connecting the stepped portion 18 to the second stepped portion 22 of the socket having a diameter smaller than that of this outer peripheral face. The placement is effected so that a lower face of the flange portion 28 of the bearing 14 is positioned on the stepped portion 18 of the socket 12. When the flange portion 28 of the bearing 14 is disposed on the stepped portion 18 of the socket 12, there is formed slightly inwards a gap in the radial direction between the outer peripheral face of the flang portion 28 and the face of the socket 12. The stepped face under the connecting member 32 of the bearing 14 is spaced slightlty upwards away from the second stepped portion 22 of the socket 12.

Figure 2:
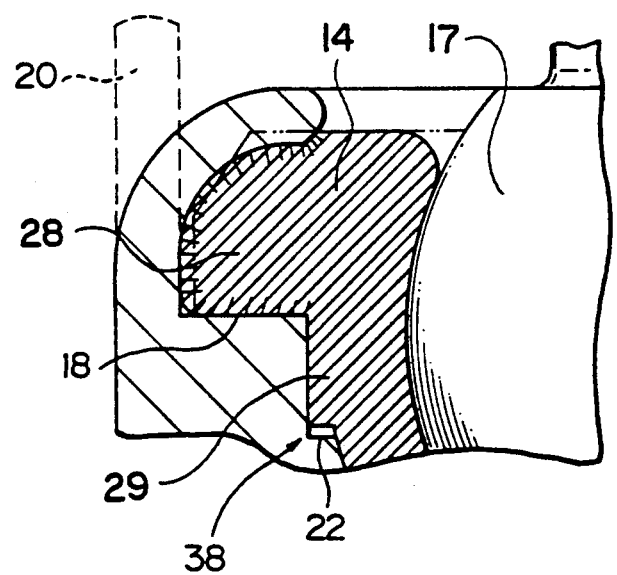

Subsequently, the rising portion 20 of the socket 12 is caulked by a known means from a position indicated by a broken line to a position of a solid line in FIG. 2.

Initially, the flange portion 28 of the bearing 14 disposed in a position of a one-dotted line of FIG. 2 functions as follows. As the rising portion 20 of the socket 12 is caulked inwards, the member 20 is bent along the chamfered outer end 34 of the bearing 14. As a result, the upper part of the flange portion 28 is turned inwards to embrace the upper face fo the ball stud, thus making removal of the ball stud 16 impossible. The gap between the outer peripheral face of the flange portion 28 and the inner face of the socket 12 acts to absorb a crosswise deformation of the flange portion 28 of the bearing 14 which has been compressively deformed by caulking. As illustrated in FIG. 2, a gap 38 is formed between the second stepped portion 22 of the socket 12 and the lower face of the connecting member 32 of the bearing 14. The gap 38 is intended to completely absorb a vertical deformation when a spherical center error is created in a press-fitting direction of the ball stud 16.

Only the flange portion of the bearing is compressively deformed and held by the socket. Other parts of the bearing are simply press-fitted therein. The preloads given by the bearing serve to improve a holding property of the ball stud and to secure durability of the ball joint.

The ball joint of this invention exhibits the following advantages. Collapse caused by caulking of the bearing can be limited to the flange portion of the bearing. Hence, the function and performance of the ball joint can be sufficiently maintained. It is also feasible to provide the simply constructed ball joint at a low cost.

Besides, the caulking load does not cause any influences on the performance of the ball joint, and hence a mass production is attainable. A ball joint which permits an increase in the caulking strength and exhibits a high working strength can also be provided.

According to this invention, it is possible to provide an inexpensive ball joint ball joint by reducing the number of components and of machining steps.

There can be provided a ball joint which provides a reliable and stable performance and has sufficient durability as a result of its uniform preloads.

The ball joint of this invention is useful for general industrial machines, automobiles, stabilizers, control links and so on.

Although the illustrative embodiments of the present invention have been described in detail with reference to the accompanying drawings, it is to be understood that the present invention is not limited to those embodiments. Various changes or modifications may be effected therein by one skilled in the art without departing from a scope or spirit of the invention.

What is claimed is:

1. A ball joint comprising:
   socket having a recess therein;
   a bearing contained in said recess and having a spherical cavity;
   a ball stud having a ball portion contained in said spherical cavity;
   a first annular cavity formed on an inner wall of said recess in said socket, said cavity having a first stepped portion;
   a rising portion rising integrally from an outer periphery of said first stepped portion;
   a second annular cavity formed on the inner wall of said recess and spaced apart from said first cavity, said second annular cavity having a second stepped portion and a diameter less than a diameter of said first annular cavity;
   a first flange portion provided on the outer periphery of said bearing and contained in said first cavity;
   a second flange portion provided on the outer periphery of said bearing and contained in said second cavity;
   said rising portion being caulked on said bearing to prevent removal of said bearing from said recess of said socket;
   said first flange portion being supported on said first stepped portion when said rising portion is caulked on said bearing.

2. A ball joint as set forth in claim 1, wherein a gap is provided between said second stepped portion and said second flange portion.

3. A ball joint comprising:
a socket having a recess therein;
a bearing contained in said recess and having a spherical cavity;
a ball stud having a ball portion contained in said spherical cavity;
said socket having a first annular shoulder portion formed on an inner wall of said socket, a rising portion rising integrally from an outer periphery of said first annular shoulder portion, and a second annular shoulder portion formed on the inner wall of said socket and spaced apart from said first annular shoulder portion;
a first flange portion on said bearing and supported on said first annular shoulder portion;
a second flange portion on said bearing and located facing said second annular shoulder portion;
said rising portion being caulked on said bearing to prevent removal of said bearing from said recess of said socket.

4. A ball joint as set forth in claim 3, wherein a gap is provided between said second annular shoulder portion and said second flange portion.

* * * * *

UNITED STATES PATENT AND TRADEMARK OFFICE
CERTIFICATE OF CORRECTION

PATENT NO. : 5,078,531

DATED : January 7, 1992

INVENTOR(S) : Motohiro Sakai and Tsuneharu Wasada

It is certified that error appears in the above-identified patent and that said Letters Patent is hereby corrected as shown below:

Column 4, Line 43, Claim 1, insert "a" before "socket".

Signed and Sealed this

Fifteenth Day of June, 1993

Attest:

MICHAEL K. KIRK

Attesting Officer

Acting Commissioner of Patents and Trademarks